(12) United States Patent
Juels

(10) Patent No.: US 9,154,496 B2
(45) Date of Patent: Oct. 6, 2015

(54) PROACTIVATION METHODS AND APPARATUS FOR PASSWORD-HARDENING SYSTEMS

(71) Applicant: EMC Corporation, Hopkinton, MA (US)

(72) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/036,225

(22) Filed: Sep. 25, 2013

(65) Prior Publication Data

US 2015/0089609 A1 Mar. 26, 2015

(51) Int. Cl.
*H04L 29/06* (2006.01)
*G06F 21/31* (2013.01)
*G06F 21/46* (2013.01)
*G06F 21/45* (2013.01)

(52) U.S. Cl.
CPC .............. *H04L 63/083* (2013.01); *G06F 21/31* (2013.01); *G06F 21/313* (2013.01); *G06F 21/45* (2013.01); *G06F 21/46* (2013.01); *H04L 63/10* (2013.01)

(58) Field of Classification Search
CPC combination set(s) only.
See application file for complete search history.

(56) References Cited

U.S. PATENT DOCUMENTS

| | | | |
|---|---|---|---|
| 6,240,184 B1 * | 5/2001 | Huynh et al. | 380/206 |
| 6,732,278 B2 * | 5/2004 | Baird et al. | 726/7 |
| 7,065,786 B2 * | 6/2006 | Taguchi | 726/18 |
| 7,093,291 B2 * | 8/2006 | Bailey | 726/23 |
| 7,451,322 B2 * | 11/2008 | Lee | 713/183 |
| 7,742,996 B1 * | 6/2010 | Kwan | 705/72 |
| 8,458,484 B2 * | 6/2013 | Burke et al. | 713/184 |
| 2002/0029341 A1 * | 3/2002 | Juels et al. | 713/184 |
| 2002/0112183 A1 * | 8/2002 | Baird et al. | 713/201 |
| 2003/0110381 A1 * | 6/2003 | Aoshima et al. | 713/168 |
| 2003/0145224 A1 * | 7/2003 | Bailey | 713/201 |
| 2003/0172281 A1 * | 9/2003 | Lee | 713/183 |
| 2004/0172535 A1 * | 9/2004 | Jakobsson et al. | 713/168 |
| 2013/0212658 A1 * | 8/2013 | Amaya Calvo et al. | 726/6 |

OTHER PUBLICATIONS

A. Herzberg et al., "Proactive Secret Sharing Or: How to Cope With Perpetual Leakage," Proceedings of the 15th Annual International Cryptology Conference, Advances in Cryptology (CRYPTO), Lecture Notes in Computer Science, Aug. 1995, pp. 339-352, vol. 963.

(Continued)

*Primary Examiner* — Peter Poltorak
(74) *Attorney, Agent, or Firm* — Ryan, Mason & Lewis, LLP

(57) ABSTRACT

A password-hardening system comprises at least first and second servers. The first server is configured to store a plurality of sets of passwords for respective users with each such set comprising at least one valid password for the corresponding user and a plurality of chaff passwords for that user. The second server is configured to store at least a portion of valid password indication information indicating for each of the sets which of the passwords in that set is a valid password. The first and second servers are further configured to proactively update the sets of passwords and the valid password indication information in each of a plurality of epochs. The valid password indication information may comprise, for example, valid password index values for respective ones of the users, with the index values being stored as a shared secret across the first and second servers.

20 Claims, 3 Drawing Sheets

(56) References Cited

OTHER PUBLICATIONS

A. Juels et al., "Honeywords: Making Password-Cracking Detectable," Manuscript: people.csail.mit.edu/rivest/pubs/JR13.pdf, May 2013, 19 pages.

R. Morris et al., "Password Security: A Case History," Communications of the ACM, Nov. 1979, pp. 594-597, vol. 22, No. 11.

* cited by examiner

PROACTIVATION METHODS AND APPARATUS FOR PASSWORD-HARDENING SYSTEMS

FIELD

The field relates generally to user verification techniques, and more particularly to password-hardening systems for use in conjunction with such techniques.

BACKGROUND

In order to gain access to protected resources, users are often required to enter static passwords in order to prove their identity. Different applications, accounts or other types of protected resources associated with a given user may each require entry of a distinct alphanumeric password, thereby necessitating that the user remember multiple such passwords in order to access the corresponding resources. This is not only unduly burdensome for the user, but can also undermine security in that the user will often write down the passwords or otherwise make them vulnerable to inadvertent disclosure.

Various password-hardening systems are known that attempt to alleviate this situation. For example, it is possible for a user to store multiple passwords in encrypted form in a so-called password "vault" that is protected by a master password. Nonetheless, such password-hardening systems can remain susceptible to attack. In the case of a password vault, compromise of the master password gives the attacker immediate access to multiple valid passwords stored in the vault. Similar issues arise in hashed password files and other arrangements involving storage of multiple valid passwords. Accordingly, a need exists for improved security in password vaults, hashed password files and other types of password-hardening systems.

SUMMARY

Illustrative embodiments of the present invention include proactivation methods and apparatus that can provide significantly enhanced security in a wide variety of different types of password-hardening systems.

In one embodiment, a password-hardening system comprises at least first and second servers. The first server is configured to store a plurality of sets of passwords for respective users with each such set comprising at least one valid password for the corresponding user and a plurality of chaff passwords for that user. The second server is configured to store at least a portion of valid password indication information indicating for each of the sets which of the passwords in that set is a valid password. The first and second servers are further configured to proactively update the sets of passwords and the valid password indication information in each of a plurality of epochs.

The valid password indication information may illustratively comprise valid password index values for respective ones of the users. For example, a given one of the sets of passwords stored in the first server for a user $u_i$ may be of the form:

$$W_i = (w_{i,1}, w_{i,2}, \ldots, w_{i,k}),$$

where k denotes the total number of passwords in the set $W_i$, a given one of the passwords $w_{i,j}$ is a valid password $p_i$ of user $u_i$, the remaining k−1 passwords $w_{i,j}$ are chaff passwords, and the valid password indication information stored on the second server comprises an index value c(i) denoting an index of the valid password for user $u_i$ in the set $W_i$ such that $w_{i,c(i)} = p_i$.

Numerous other configurations of password sets and associated valid password indication information may be used.

In some embodiments, the valid password indication information may be stored in its entirety in the second server. For example, in such an embodiment a password is received from a user attempting to access a protected resource, and a determination is made in the first server as to whether or not the received password is in the set of passwords stored for the user. If the received password is in the set of passwords stored for the user, a determination is made in the second server as to whether or not the received password is the valid password or one of the chaff passwords. If the received password is the valid password, access to the protected resource is granted. However, if the received password is one of the chaff passwords, access to the protected resource is denied and an appropriate remedial action is taken in accordance with a specified policy.

In other embodiments, the index values or other valid password indication information may be stored as a shared secret across the first and second servers. In one possible implementation of such an arrangement, the index values c(i) for respective ones for the n users may remain constant over at least a subset of the epochs. For a given received password having index j in the corresponding set $W_i$ of passwords, the first and second servers may collaborate with one another to determine jointly that j=c(i). For example, in epoch t, for user $u_i$, the first server stores a value $A_i^{(t)}$ and the second server stores a value $B_i^{(t)}$, and the index value c(i) is determined as a function of the values $A_i^{(t)}$ and $B_i^{(t)}$, possibly by computing $c(i) = ((A_i^{(t)} + B_i^{(t)}) \bmod k) + 1$. Other functions of the values $A_i^{(t)}$ and $B_i^{(t)}$ may be used to determine the index value c(i).

DETAILED DESCRIPTION

Illustrative embodiments of the present invention will be described herein with reference to exemplary communication systems, password-hardening systems and associated processing devices. It is to be appreciated, however, that the invention is not restricted to use with the particular illustrative system and device configurations shown. Accordingly, the term "password-hardening system" as used herein is intended to be broadly construed, so as to encompass, for example, systems comprising only a single processing device, systems in which multiple processing devices communicate with one another over a network or other connection, and numerous other system types and configurations.

Figure 1:
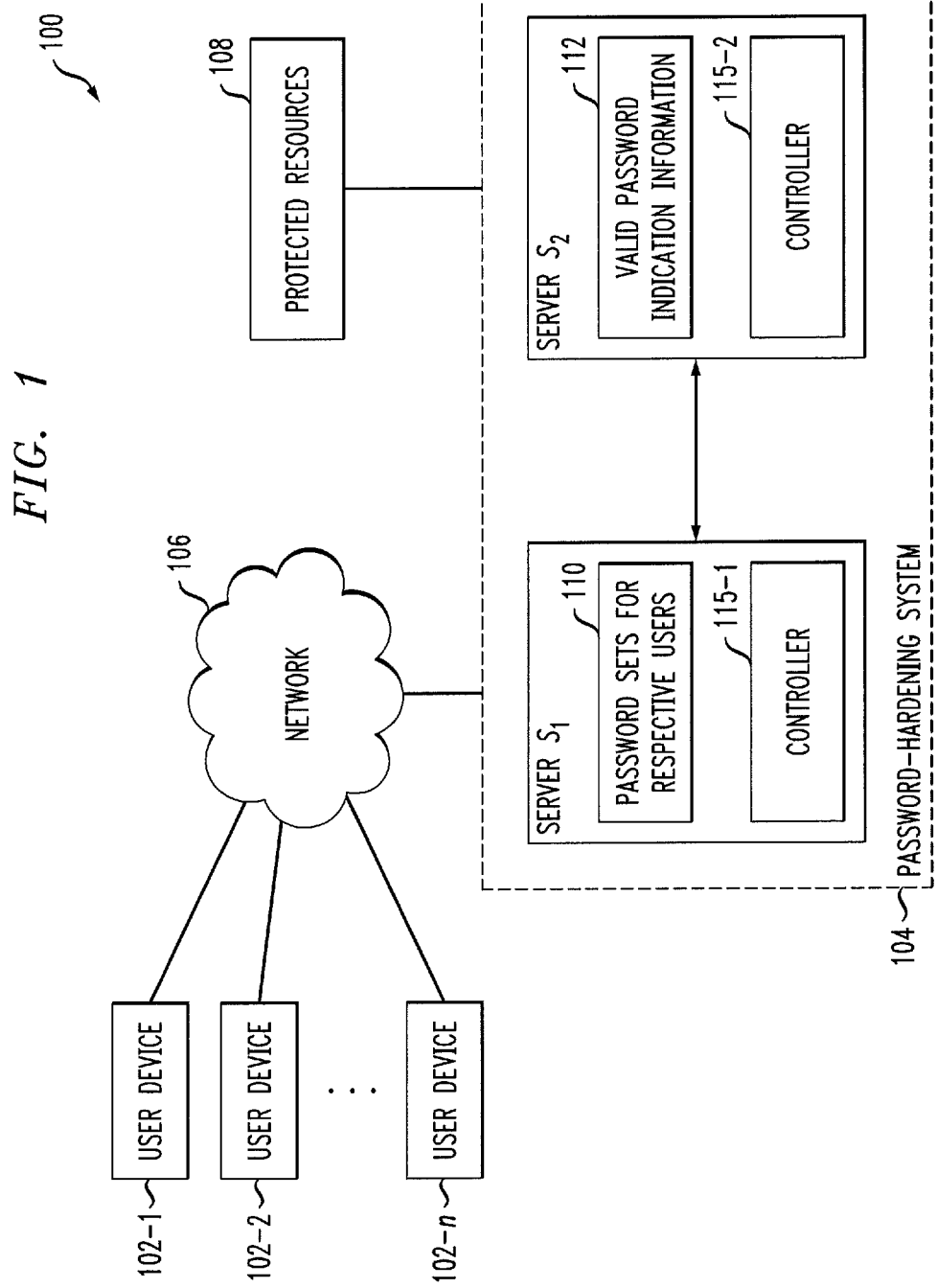
FIG. 1 is a block diagram of a communication system that includes a password-hardening system having proactivation functionality in an illustrative embodiment of the invention.

FIG. 1 shows a communication system 100 in an illustrative embodiment of the present invention. The system 100 comprises a plurality of user devices 102-1, 102-2, ... 102-n that are configured to communicate with a password-hardening system 104 over a network 106 in order to gain access to protected resources 108. Although shown as separate from the protected resources 108 in the present embodiment, the password-hardening system 104 in other embodiments may be wholly or partially incorporated within one or more of the protected resources 108. The protected resources 108 may comprise, for example, multi-user computer systems, web sites, applications, etc. Such protected resources may reside at least in part on one or more of the user devices 102 rather than being separate from those devices as illustrated in the figure.

The password-hardening system 104 comprises first and second servers $S_1$ and $S_2$. It should be understood that the particular number of servers shown in this embodiment is exemplary only. Accordingly, other embodiments may utilize more than two servers in implementing the password-hardening system 104.

It is assumed in the present embodiment that each of the user devices 102 is able to communicate over the network 106 with at least one of the servers $S_1$ and $S_2$, although other arrangements can be used in other embodiments. For example, in some embodiments, at least some communications between the user devices 102 and one or more of the servers $S_1$ and $S_2$ may alternatively flow through one or more of the protected resources 108. In such an arrangement, at least portions of the protected resources 108 may be coupled to the network 106 and at least portions of the password-hardening system 104 may be decoupled from the network 106.

The user devices 102 may comprise, for example, mobile telephones, laptop or tablet computers, desktop computers, gaming consoles or other user devices in any combination. Each such device may be associated with a corresponding user to be subject to verification in the system 100, where "user" as the term is applied herein should be generally construed so as to encompass, for example, a human user or an associated hardware or software entity. Numerous alternative arrangements are possible.

A given user device may incorporate or otherwise have associated therewith a hardware or software authentication token, although such tokens are not required in embodiments of the invention. One example of an authentication token that may be used in conjunction with user verification in some embodiments is a time-synchronous authentication token such as an RSA SecurID® user authentication token, commercially available from RSA, The Security Division of EMC Corporation, of Bedford, Mass., U.S.A. For example, personal identification numbers (PINs) or other personal identifiers typically used in conjunction with authentication tokens to implement two-factor authentication processes may be viewed as respective passwords as that term is broadly used herein. Accordingly, the term "password" as used herein should be understood to encompass any arrangement of words, phrases, numbers or other combination of characters suitable for user verification.

The network 104 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The first server $S_1$ is configured to store password sets 110 for respective ones of a plurality of users. In the present embodiment, it is assumed without limitation that each of user devices 102 is associated with a different user for which a corresponding password set is stored in the first server. Thus, in this embodiment, the first server stores n sets of passwords, one set for each of the users associated with respective ones of the devices 102. Each such set comprises at least one valid password for the corresponding user and a plurality of chaff passwords for that user. The term "chaff password" as used herein refers to a fake or decoy password that is used to make it more difficult for an attacker to determine which of the passwords in a given one of the password sets 110 is a valid password for the corresponding user. Such fake or decoy passwords may also be referred to herein as "honeywords." The term "chaff password" as used herein is intended to be broadly construed so as to encompass these and other arrangements of invalid passwords configured to deter an attacker.

The chaff passwords should be selected so as to be very difficult to distinguish from a valid password. For example, the chaff passwords may be drawn randomly from a probability distribution substantially the same as that from which the valid password is selected. References herein to "random" selection or values are intended to be broadly construed so as to also encompass pseudorandom variants.

The second server $S_2$ is configured to store valid password indication information 112 that indicates for each of the n password sets which of the passwords in that set is a valid password. The valid password indication information may illustratively comprise valid password index values for respective ones of the n users. Assuming without limitation that each of the n password sets includes only a single valid password arranged within a plurality of chaff passwords, the index values may simply provide respective numerical indicators of which password in each set of passwords is the single valid password.

The first and second servers $S_1$ and $S_2$ further comprise respective controllers 115-1 and 115-2 that direct the operations of their corresponding servers to provide proactivation functionality and other functionality associated with user verification as described herein. For example, the controllers 115 in the present embodiment cooperate to proactively update the sets of passwords 110 and the valid password indication information 112 in each of a plurality of epochs. Although shown as comprising separate internal controllers 115 in the present embodiment, the servers in other embodiments may instead be associated with a single controller that may be arranged at least in part internal to a particular one of the servers, or external to both of the servers.

The servers $S_1$ and $S_2$ may be implemented, for example, as respective physically separated processing devices, possibly located in different computing systems or organizations. Alternatively, such servers may represent distinct virtual servers that may reside on the same physical infrastructure. Other types of multiple server arrangements may be used in implementing the password-hardening system 104. Accordingly, the term "server" as used herein is intended to be broadly construed.

The password sets 110 and corresponding valid password indication information 112 are assumed to be stored in respective memories of the servers $S_1$ and $S_2$. Such storage may include only partial or temporary storage of the sets 110 and associated information 112. It should be noted that the particular ordering used in the names or other descriptions herein of elements such as 110 and 112 should not be construed as requiring any particular ordering of the corresponding stored information items in an actual memory of a processing device that implements a given one of the servers.

The controllers 115 collaborate with one another to verify a given user based on a submitted password. The FIG. 1 embodiment may be viewed as an example of an embodiment in which the valid password indication information 112 is stored in its entirety in the second server, although it is to be appreciated that other embodiments may store this information in different ways, such as in the form of a shared secret across the first and second servers. In an arrangement of the latter type, also referred to herein as a distributed arrangement for storage of the valid password indication information 112, neither of the first and second servers individually stores the complete valid password indication information.

In one possible operating configuration of the FIG. 1 embodiment, a password is received from a user attempting to access one of the protected resources 108 via one of the user devices 102. The received password is initially supplied to the first server $S_1$ and a determination is made in the first server as to whether or not the received password is in the set of passwords stored for the user. This determination is assumed to be made by the controller 115-1. If the received password is determined to be in the set of passwords stored for the user, the password is then supplied to the second server $S_2$. A further determination is then made in the second server as to whether or not the received password is the valid password or one of the chaff passwords. This determination is assumed to be made by the controller 115-2. If the received password is the valid password, access to the protected resource is granted by the password-hardening system 104. However, if the received password is one of the chaff passwords, access to the protected resource is denied and an appropriate remedial action is taken in accordance with a specified policy.

For example, receipt of one of the chaff passwords in conjunction with an attempt to access a protected resource may be an indication that the password set for the user has been compromised by an attacker, but the attacker has been unable to determine which of the passwords in the set is the valid password and is therefore attempting to access the protected resource using one of the chaff passwords. An appropriate remedial action in this scenario may be to reconfigure the chaff passwords and to update the password set and its associated valid password indication information.

The user devices 102, password-hardening system 104 and protected resources 108 may each be implemented using one or more processing devices. A given such processing device may comprise, for example, a computer or other type of processing device configured to communicate with other such devices over the network 106. Each such processing device generally comprises at least one processor and an associated memory, and implements one or more functional modules for controlling certain features of the communication system 100.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. Such a memory and other memories disclosed herein may be viewed as examples of what are more generally referred to as "processor-readable storage media" storing executable computer program code.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Various elements of the communication system 100, such as the controllers 115-1 and 115-2 of the respective servers $S_1$ and $S_2$, may be implemented at least in part in the form of software that is stored in a memory of a processing device and executed by a processor of that processing device.

The communication system 100 in the present embodiment implements one or more processes for user verification based on submitted passwords. An example of such a process performed at least in part in conjunction with a user submitting a password for verification will be described in conjunction with FIG. 2 below, but it should be understood that numerous other types of processes may be used in other embodiments.

It is to be appreciated that the particular set of elements shown in FIG. 1 for providing user verification is presented by way of example, and in other embodiments additional or alternative elements may be used. Thus, another embodiment may include additional networks and additional user devices, servers or protected resources.

Communications among user devices, servers, protected resources and other system elements in embodiments of the invention may utilize authenticated, confidential and integrity-protected channels or other types of secure channels. For example, secure channels in some embodiments may be established using techniques such as secure sockets layer (SSL) or transport layer security (TLS). Such techniques are well known in the art and therefore not described in detail herein.

As mentioned previously, various elements of system 100 such as the servers $S_1$ and $S_2$ or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices. Examples of such processing platforms that may form at least a portion of the system 100 will be described below in conjunction with FIGS. 3 and 4.

The operation of the system 100 will now be described in greater detail with reference to the flow diagram of FIG. 2, which illustrates a set of operations performed by password-hardening system 104 in verifying a user responsive to a submitted password in an illustrative embodiment.

The process as shown includes steps 200 through 208, all of which are assumed to be performed by elements of the password-hardening system 104. It is to be appreciated that in other embodiments one or more such steps may be implemented at least in part by other system elements.

Figure 2:
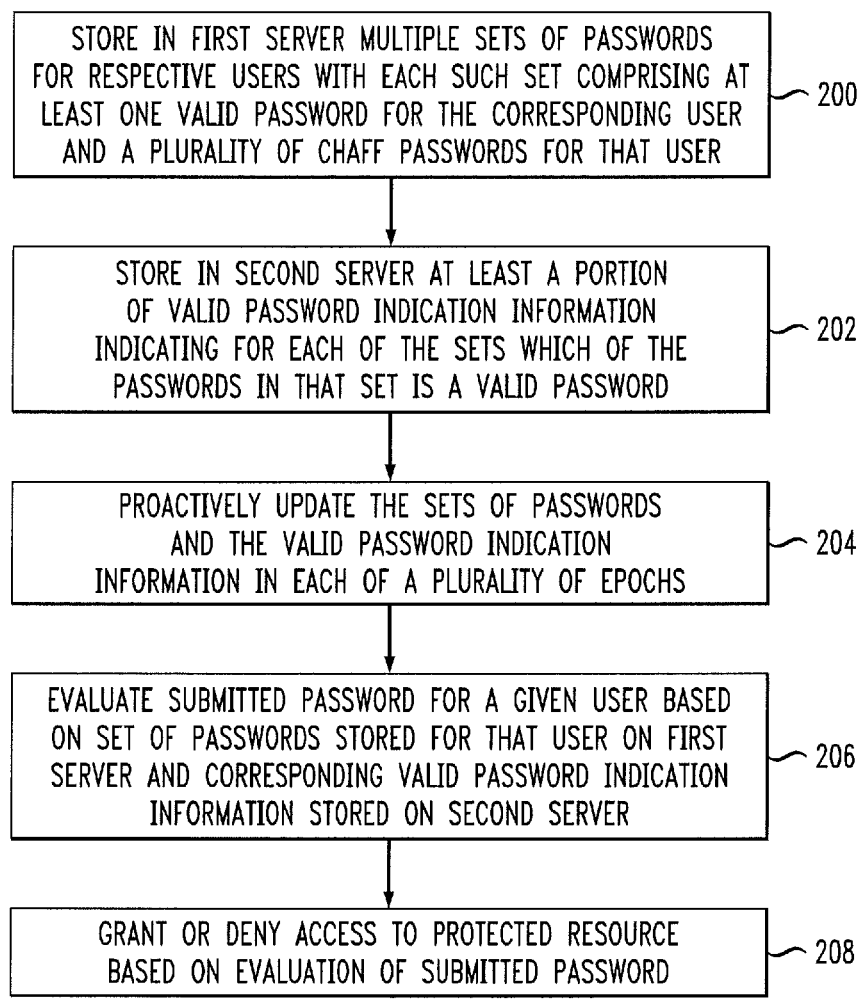
FIG. 2 is a flow diagram illustrating an exemplary user verification process performed in the password-hardening system of FIG. 1.

As in the previous description of system 100 above, it is assumed for purposes of the illustrative process of FIG. 2 that there are n distinct users, and that the password sets 110 include n password sets, one for each of the n users, with each such set including only a single valid password and multiple chaff passwords. It is further assumed for this embodiment that the password sets 110 are stored on first server $S_1$ and that the corresponding valid password indication information 112 is stored at least in part on second server $S_2$. Thus, this embodiment encompasses arrangements in which the valid password indication information is stored in its entirety on the second server, as well as other arrangements, such as those in which the valid password indication information is stored in a distributed manner as a shared secret across the first and second servers.

In step 200, multiple sets of passwords are stored in the first server $S_1$ for respective ones of the n users with each such set comprising at least one valid password for the corresponding user and a plurality of chaff passwords for that user. The chaff passwords may be generated by the corresponding controller 115-1 possibly operating in cooperation with controller 115-2 and based on parameters characterizing a known valid password.

In step 202, at least a portion of the valid password indication information 112 for the password sets 110 is stored in the second server $S_2$. This information indicates for each of the password sets which of the passwords in that set is a valid password. Again, it is assumed that only one password in each set is a valid password, but other embodiments can include multiple valid passwords in each set. Step 202 may involve, for example, storing the valid password indication information 112 in its entirety on the second server, as in the FIG. 1 embodiment, or storing such information in a distributed manner as a shared secret across the first and second servers.

In step 204, the sets of passwords and the valid password indication information are proactively updated in each of a plurality of epochs. This proactive updating is assumed to be performed by controllers 115-1 and 115-2 of the respective first and second servers, but may alternatively be performed by other system elements in other embodiments. Particular examples of proactive update techniques that can be applied in this step will be described in detail elsewhere herein.

In step 206, a password submitted for a given user is evaluated based on the set of passwords stored for that user on the first server and the corresponding valid password indication information at least a portion of which is stored on the second server. As previously mentioned, controllers 115-1 and 115-2 are assumed to be utilized in this evaluation of the given submitted password. It should again be noted that the term "user" in this context and elsewhere herein should not be construed as limited to a human user, but may additionally or alternatively refer, for example, to a particular hardware or software entity.

In step 208, access to a given one of the protected resources 108 is granted or denied based on the evaluation of submitted password. Accordingly, if the submitted password is determined by the first server to be in the password set for the user and then if the submitted password is determined by the second server to correspond to the valid password of the set and not one of the chaff passwords of the set, access to the protected resource is granted and otherwise access to the protected resource is denied.

The particular processing operations and other system functionality described in conjunction with the flow diagram of FIG. 2 are presented by way of illustrative example only, and should not be construed as limiting the scope of the invention in any way. Alternative embodiments can use other types of processing operations for user verification using stored password sets and associated valid password indication information. For example, the ordering of the process steps may be varied in other embodiments, or certain steps may be performed concurrently with one another rather than serially.

Also, alternative processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be further described herein, although alternative embodiments of the present invention may incorporate aspects of such processes.

Additional details regarding the operation of embodiments of the invention will now be provided with reference to exemplary arrangements in which it is again assumed for simplicity and clarity of illustration that the password-hardening system 104 comprises the first and second servers $S_1$ and $S_2$. Those skilled in the art will recognize that the described two-server embodiments can be extended in a straightforward manner to other embodiments that include more than two servers.

In the two-server embodiments, neither server alone stores full information about a given user password, and therefore the password-hardening system is resilient to compromise of either of the two servers. The proactive updating of the password sets and associated valid password indication information is illustratively configured so as to ensure that the password-hardening system remains secure in situations involving transient compromise of the two servers at different times.

Additional details regarding the proactive updating will be described below in conjunction with particular embodiments of the communication system 100. It is to be appreciated, however, that the particular embodiments described below are presented by way of illustrative example only and that the disclosed techniques can be adapted in a straightforward manner for use with other types and configurations of password-hardening system 104 and protected resources 108.

In some of the embodiments utilized below to illustrate proactivation functionality, it is assumed that the protected resources 108 comprise a computer system with n users $u_1$, $u_2, \ldots, u_n$ where $u_i$ is the username for the ith user. The computer system is assumed to be configured to allow a user to "log in" after he or she has provided a username and a valid password. We let $p_i$ denote the valid password for user $u_i$. It is further assumed that the computer system comprises the first server $S_1$ of the password-hardening system 104, and also that the computer system is configured for communication with the second server $S_2$ of the password-hardening system 104. Accordingly, the computer system comprising the first server in these illustrative embodiments may be implemented on a different processing device or processing platform than the second server. Such a computer system may itself be considered an example of a "server" as that term is broadly used herein.

The first server $S_1$ that is implemented in the computer system may utilize a cryptographic hash function H to store hashes of passwords rather than raw passwords. For example, the first server may maintain a file F containing username and password-hash pairs. The computation of the hash function H may involve the use of system-specific or user-specific parameters (e.g., per-system or per-user "salts"). The file F may be viewed as an example of what is also referred to herein as a "hashed password file."

The second server $S_2$ that is assumed to be external to the computer system may maintain the valid password indication information 112 in the form of a single index value $c(i)$ for each user $u_i$ with the index values being integers in the range 1 to k, where k denotes the total number of passwords in the set of passwords for user $u_i$ in password sets 110. The second server may be configured to accept command messages such as Set:i,j in order to set $c(i)$ to value j, and Check:i,j in order to check that $c(i)=j$, although a wide variety of other messages could be used.

By way of example, the set of passwords stored in the first server $S_1$ for user $u_i$ may be more particularly of the form $W_i=(w_{i,1}, w_{i,2}, \ldots, w_{i,k})$, where as noted above i denotes a particular one of n users, and k denotes the total number of passwords in the set. A given one of the passwords $w_{i,j}$ is the valid password $p_i$ of user $u_i$, and the remaining k−1 passwords $w_{i,j}$ are chaff passwords. Again, the valid password indication information stored on the second server $S_2$ comprises an index value $c(i)$ denoting an index of the valid password for user $u_i$ in the set $W_i$ such that $w_{i,c(i)}=p_i$. Other formats may be used for the sets of passwords 110 and the associated valid password indication information 112 in other embodiments.

The value k serves as a security parameter, and may be the same for all users or different for different users. For example, a relatively low value (e.g., k=20) could be utilized for normal system users and a higher value (e.g., $k_i$=200) for system administrators. Values as low as k=2 or larger than k=1000 could be used, although a more typical value is on the order of k=20.

In this embodiment, exactly one of the passwords is equal to the valid password $p_i$ known to user $u_i$. The index value c(i) denotes the "correct" index of the valid password of user $u_i$ in the set $W_i$, so that $w_{i,c(i)}=p_i$.

The above-noted file F maintained on the first server $S_1$ is more particularly configured in the present embodiment so as to contain an extended entry for each user $u_i$, with the extended entry being of the form $(u_i, H_i)$, where $v_{i,j}=H(w_{i,j})$ is the value of the hash of the user's jth password $w_{i,j}$, and $H_i=(v_{i,1}, v_{i,2}, \ldots, v_{i,k})$ is the set of all these hash values.

The user need only remember his or her valid password $p_i$ and need not know the values of the chaff passwords or even know about their existence.

Let Gen(k) denote a procedure used to generate both a set $W_i$ of length k of passwords for user $u_i$ and an index c(i) of the correct or valid password $p_i$ within $W_i$:

$$(W_i, c(i)) = \text{Gen}(k)$$

The procedure Gen(k) is typically randomized and involves interaction with the user so as to allow the user to create or otherwise learn the valid password. We may represent this user interaction in some embodiments by allowing an additional argument in the form of a user-supplied password $p_i$ to Gen(k), so that Gen(k; $p_i$) ensures that $p_i$ is the password in $W_i$; that is, $p_i=w_{i,c(i)}$.

As indicated above, per-system or per-user salts or other parameters may be utilized in the hash computation.

Additionally, hashing of $w_{i,j}$ may also take j as an additional parameter. Such distinct per-password salting prevents an adversary from hashing a password guess once (e.g., with the per-user salt) and then checking the result simultaneously against all of the user's hashed passwords.

The computer system is configured to determine using the first server $S_1$ whether or not a given submitted password g is within the set of passwords for the corresponding user. If g is determined to be within the set of passwords for that user, the computer system interacts with the second server $S_2$ to determine whether g is the valid password of the password set or one of the chaff passwords.

For example, a login routine of the computer system may be configured to interact with the first and second servers. If it is determined through interaction with the first server that the hash H(g) of g does not occur in the file F in the user $u_i$'s entry $H_i$, then password g is neither the user's password nor one of the user's chaff passwords, so login is denied. Otherwise the login routine needs to determine whether g is the user's password, or it is merely one of the user's chaff passwords.

The first server $S_1$ can determine the index j such that $H(g)=v_{i,j}$, but the first server does not know whether j=c(i), in which case g is indeed the password, or not, in which case g is just a chaff password. Accordingly, the second server $S_2$ makes this determination, possibly in response to a Check:i,j message received from the login routine. If second server determines that j=c(i), an appropriate indication is sent back to the login routine. For example, the second server may respond with a signed message indicating that login is approved. Otherwise, an alarm is raised and other actions may be taken.

It may be desirable for a Check:i,j message to be sent to the second server $S_2$, even when the submitted password g is not in the set $W_i$ of passwords. In this case the Check:i,j message could specify j=0 Such an arrangement can be used to ensure that the second server is notified of every login attempt, and can observe when a password guessing attack is in progress. It might also be desirable for a Check:i,j message to include additional information that might be forensically useful, such as the IP address of the user that attempted to log in.

Many computer systems suspend an account if a threshold number (e.g., five) unsuccessful login attempts are made. In the present embodiment, such a limit is likely to be reached even if the adversary has access to $W_i$. For example, the chance that the user's valid password does not appear in the first five elements of a given random ordering of a set $W_i$ of length k=20 that contains the valid password and 19 chaff passwords is 75%. However, when it is determined that failed attempts are being made with chaff passwords that are in the password set of the user rather than arbitrary invalid passwords that are not in the password set of the user, a reduced limit may be appropriate before lockout occurs and/or additional investigations are undertaken.

When user $u_i$ changes his or her password, or sets it up when his or her account is first initialized, the computer system uses procedure Gen(k) to obtain a new or initial set $W_i$ of k passwords, the set $H_i$ of their hashes, and the value c(i) of the index of the correct password $p_i$ in $W_i$. The computer system securely notifies the second server $S_2$ of the value of c(i), and the user's entry in the file F on the first server is updated to $(u_i, H_i)$. The second server does not learn the new or initial valid password or any of the new or initial chaff passwords. All it learns is the position c(i) of the hash $v_{i,c(i)}$ of user $u_i$'s new or initial valid password in the user's set $H_i$ in F. To accomplish this, the computer system may send the second server a message of the form Set:i,j to indicate that user $u_i$ has changed or initialized his or her password and that the new value of c(i) is now j. This message and other messages referred to herein may be authenticated by the sending entity to the receiving entity.

Proactivation functionality implemented in the above-described computer system embodiments will now be described in more detail. As mentioned previously, proactive updating of the password sets and the associated valid password indication information is performed in each of a plurality of "epochs." Such epochs as the term is broadly used herein should be understood to encompass respective periods of time during which proactivation is performed. Epochs need not be of uniform length, and accordingly may vary in length over time and may also vary from user to user.

In one embodiment, proactive updating is implemented by re-randomizing the index j for user $u_i$ in each epoch. Assume that this happens at the beginning of an epoch, although other timing arrangements could be used. Thus, as an epoch begins, we set $$c(i) \xleftarrow{R} \{1, 2, \ldots, k\}$$

on the second server, where R denotes random selection. It is also possible to assign indices pseudorandomly, letting c(i) take a pseudorandom seed as additional input. In either case, we then let $w_{i,c(i)}$ be the password $p_i$ and randomly permute the chaff passwords in $W_i$. A potential drawback to this approach is that the elements of the password file F may also need to be reordered.

Reordering of the elements of the password file can be avoided by distributing the index values as a shared secret across the first and second servers. In some embodiments using this approach, the index values remain unchanged across multiple epochs, but the secret shares for the index values on the two servers are updated proactively from epoch to epoch. For example, as a more detailed illustration of this approach, in epoch t, for user $u_i$, the first server stores a value $A_i^{(t)}$ and the second server stores a value $B_i^{(t)}$, such that $c(i)=((A_i^{(t)}+B_i^{(t)}) \bmod k)+1$. The addition of 1 at the end of the equation reflects the fact that the passwords in the set are indexed starting with 1.

Given a submitted password with index j, the task of the first and second servers is to verify jointly that $j=c(i)$. This can be achieved, for example, by the first server sending $j'=((j-1)-A_i^{(t)}) \bmod k$ to the second server, and the second server verifying that $(j'-B_i^{(t)}) \bmod k=0$.

In order to protect against transient compromise of a server during the above-described proactivation process, the two servers are configured to jointly re-randomize an index value $c(i)$ without either server learning the value. It is desirable to accomplish such re-randomization using a protocol that is resilient to an actively corrupted server. With such a protocol, even an adversary that controls one of the two servers during the proactivation process learns nothing about the resulting index value $c(i)$ in that the index value continues to appear uniformly random to an attacker.

An example of a protocol of this type is as follows:

1. The first server selects $$X_i^{(t)} \xleftarrow{R} \mathbb{Z}_k;$$

the second server selects $$X_i^{(t)} \xleftarrow{R} \mathbb{Z}_k.$$

2. The first server sends a cryptographic commitment C on $X_i^{(t)}$ to the second server.
3. The second server sends $Y_i^{(t)}$ to the first server.
4. The first server decommits $X_i^{(t)}$ for the second server.
5. The first server sets $A_i^{(t)} \leftarrow (A_i^{(t-1)}+X_i^{(t)}+Y_i^{(t)}) \bmod k$; the second server sets $B_i^{(t)} \leftarrow (B_i^{(t-1)}-X_i^{(t)}-Y_i^{(t)}) \bmod k$.

Again, this particular protocol as well as the associated secret sharing arrangement are exemplary only, and may be varied in other embodiments.

In some embodiments, it may be desirable for the second server to receive inputs from the first server, but not transmit to the first server. Accordingly, a trusted third party may be configured to select a random value $Z_i^{(t)} \in_R \mathbb{Z}_k$ and transmit it to both the first server and the second server. The first server then sets $A_i^{(t)} \leftarrow (A_i^{(t-1)}+Z_i^{(t)}) \bmod k$ and the second server sets $B_i^{(t)} \leftarrow (B_i^{(t-1)}-Z_i^{(t)}) \bmod k$. As another example, the first server may select $Z_i^{(t)} \in_R \mathbb{Z}_k$ and transmit it to the second server, with both updating their shares as in the third-party proactivation approach. However, poor randomness in the first server, possibly due to tampering by an attacker, may result in predictable selection of $Z_i^{(t)}$ as no randomness is supplied by the second server in this variant.

It should be appreciated that the particular features of the described two-server embodiments above are presented by way of example only, and other embodiments need not incorporate these features.

The foregoing embodiments should be considered as illustrative only, and numerous other embodiments can be configured using the techniques disclosed herein, in a wide variety of different authentication applications. For example, as indicated previously, techniques described in the context of two servers can be extended in a straightforward manner to more than two servers.

It should also be understood that proactivation functionality such as that described in conjunction with FIGS. 1 and 2 can be implemented at least in part in the form of one or more software programs stored in memory and executed by a processor of a processing device such as a computer. As mentioned previously, a memory or other storage device having such program code embodied therein is an example of what is more generally referred to herein as a "processor-readable storage medium."

The embodiments described in conjunction with FIGS. 1 and 2 can provide a number of significant advantages relative to conventional practice. For example, these embodiments exhibit significantly enhanced security relative to conventional arrangements in which multiple valid passwords are stored together in a single location, such as in a hashed password file or a password vault. Embodiments of the present invention can be used in the hashed password file or password vault contexts as well as other password storage contexts, for example, by obscuring each valid password of a given user in a corresponding proactively updated set of passwords that includes not only the valid password but also multiple chaff passwords. Similarly, the disclosed techniques can be adapted to obscure a valid password file or vault of a given user within multiple chaff password files or vaults generated for that user. Accordingly, the term "password" as used herein is intended to encompass a concatenation or other combination of multiple sub-passwords, each of which may be used to allow a given user to access a different protected resource.

As indicated previously, the communication system 100 may be implemented using one or more processing platforms. One or more of the processing modules or other components of system 100 may therefore each run on a computer, storage device or other processing platform element. A given such element may be viewed as an example of what is more generally referred to herein as a "processing device."

Figure 3:
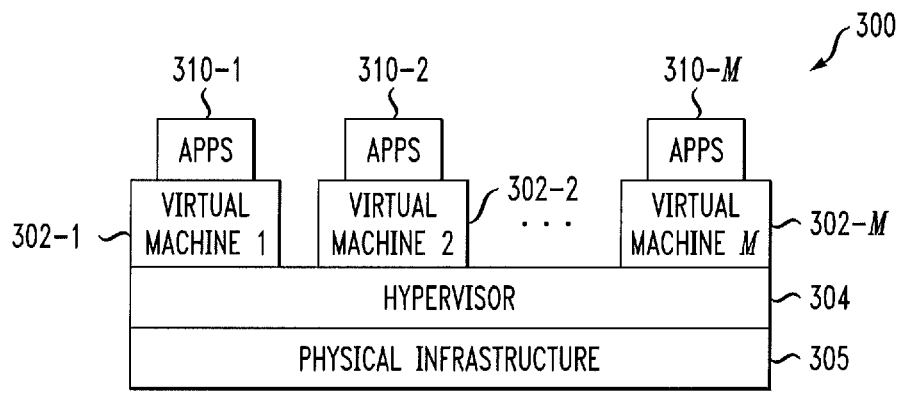
FIGS. 3 and 4 show examples of processing platforms that may be utilized to implement at least a portion of the communication system of FIG. 1.

Referring now to FIG. 3, one possible processing platform that may be used to implement at least a portion of one or more embodiments of the invention comprises cloud infrastructure 300. The cloud infrastructure 300 in this exemplary processing platform comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

The cloud infrastructure 300 may encompass the entire system 100 or only portions of that system, such as one or more of the user devices, servers, controllers or protected resources in the system 100.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100.

Figure 4:
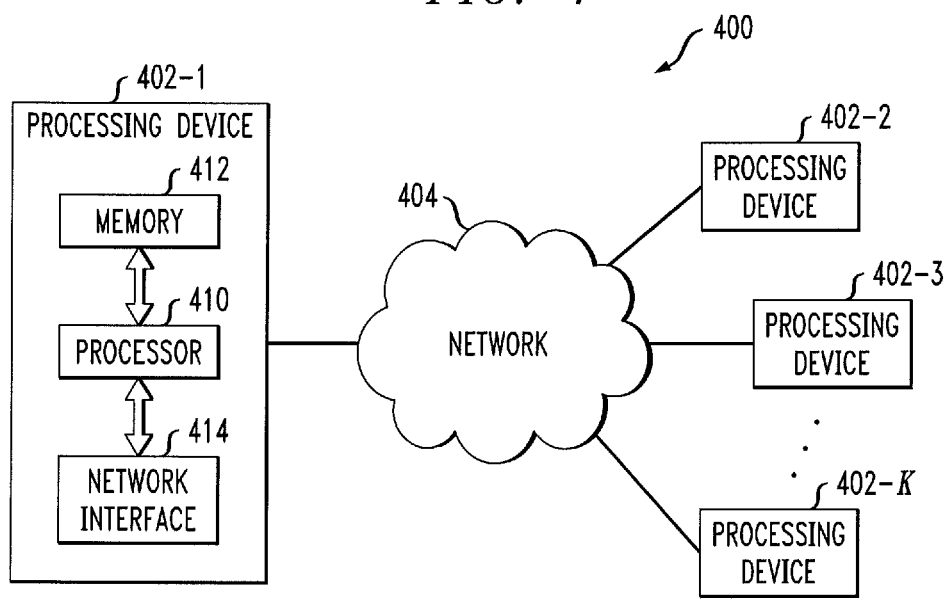

Another example of a processing platform is processing platform 400 shown in FIG. 4. The processing platform 400 in this embodiment comprises at least a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, a cellular network, a wireless network such as WiFi or WiMAX, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "processor-readable storage medium" having executable computer program code or other software programs embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, storage devices or other processing devices.

Multiple elements of system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations and other alternative embodiments may be used. For example, the techniques are applicable to a wide variety of other types of devices and systems that can benefit from improved password security as disclosed herein. Also, the particular configuration of communication system and processing device elements shown in FIGS. 1-4, and the associated verification and proactivation techniques, can be varied in other embodiments. Moreover, the various simplifying assumptions made above in the course of describing the illustrative embodiments should also be viewed as exemplary rather than as requirements or limitations of the invention, and need not apply in other embodiments. Numerous other alternative embodiments within the scope of the appended claims will be readily apparent to those skilled in the art.

What is claimed is:

1. A method comprising:
   storing in a first server a plurality of sets of passwords for respective users with each such set comprising at least one valid password for the corresponding user and a plurality of chaff passwords for that user;
   storing in a second server at least a portion of valid password indication information indicating for each of the sets which of the passwords in that set is a valid password; and
   proactively updating the sets of passwords and the valid password indication information in each of a plurality of epochs;
   wherein the valid password indication information for a given one of the sets comprises an index value denoting an index of the valid password for the given set;
   wherein the index value is stored as a shared secret across the first and second servers, such that neither the first server nor the second server stores the entire index value;
   wherein the first server stores a first value and the second server stores a second value, and the index value for the given set is a function of the first and second values;
   wherein the index value is utilized to determine whether a password received from a user attempting to access a protected resource is the valid password; and
   wherein the storing in the first server, storing in the second server and the proactively updating are performed by at least one processing device.

2. The method of claim 1 further comprising the steps of:
   determining in the first server if the received password is in the set of passwords stored for the user;
   if the received password is in the set of passwords stored for the user, determining in the second server if the received password is the valid password or one of the chaff passwords;
   if the received password is the valid password, granting access to the protected resource; and
   if the received password is one of the chaff passwords, denying access to the protected resource and taking an appropriate remedial action in accordance with a specified policy.

3. The method of claim 1 wherein the epochs are configured so as to provide one of:
   epoch lengths that are the same for all of the users but vary over time; and
   epoch lengths that are different for different ones of the users.

4. The method of claim 1 wherein a given one of the sets of passwords stored in the first server for a user $u_i$ is of the form:

$$W_i(w_{i,1}, w_{i,2}, \ldots, w_{i,k}),$$

where k denotes the total number of passwords in the set $W_i$ a given one of the passwords $w_{i,j}$ is a valid password $p_i$ of user $u_i$, the remaining k−1 passwords $w_{i,j}$ are chaff passwords, j denotes an index value in the set $W_i$ of passwords, and the valid password indication information comprises an index value c(i) denoting an index of the valid password for user $u_i$ in the set $W_i$ such that $W_{i,c(i)}=p_i$.

5. The method of claim 4 wherein proactively updating the sets of passwords and the valid password indication information comprises randomizing index j for user $u_i$ in one or more of the epochs.

6. The method of claim 5 wherein randomizing index j for user $u_i$ comprises:
   setting c(i) to a randomly selected value of k;
   assigning $w_{i,c(i)}$ to the password $p_i$; and
   randomly permuting the chaff passwords in the set $W_i$.

7. The method of claim 4 wherein index values c(i) for respective ones of the users are stored as a shared secret across the first and second servers.

8. The method of claim 7 wherein the index values c(i) for respective ones for the users remain constant over at least a subset of the epochs.

9. The method of claim 7 wherein for a given received password having index j in the corresponding set $W_i$ of passwords, the first and second servers collaborate with one another to determine jointly that j=c(i).

10. The method of claim 7 wherein in epoch t, for user $u_i$, the first value comprises a value $A_i^{(t)}$ and the second value comprises a value $B_i^{(t)}$, and the index value c(i) is a function of the values $A_i^{(t)}$ and $B_i^{(t)}$.

11. The method of claim 10 wherein the index value c(i) is determined in accordance with the following equation:

$$c(i)=((A_i^{(t)}+B_i^{(t)}) \bmod k)+1.$$

12. The method of claim 10 further comprising:
determining in the first server an index j of the received password;
sending j'=((j−1)−$A_i^{(t)}$) mod k from the first server to the second server;
verifying in the second server that (j'−$B_i^{(t)}$) mod k=0; and
granting or denying access to the protected resource based on a result of the verifying.

13. The method of claim 10 wherein the proactively updating comprises:
selecting $$X_i^{(t)} \xleftarrow{R} \mathbb{Z}_k$$

in the first server;
selecting $$Y_i^{(t)} \xleftarrow{R} \mathbb{Z}_k$$

in the second server;
sending from the first server to the second server a cryptographic commitment C on $X_i^{(t)}$;
sending $Y_i^{(t)}$ from the second server to the first server;
decommiting $X_i^{(t)}$ in the first server for the second server;
setting $A_i^{(t)} \leftarrow (A_i^{(t-1)}+X_i^{(t)}+Y_i^{(t)})$mod k in the first server; and
setting $B_i^{(t)} \leftarrow (B_i^{(t-1)}-X_i^{(t)}-Y_i^{(t)})$mod k in the second server.

14. The method of claim 10 wherein the proactively updating comprises:
receiving in the first and second servers a random value $Z_i^{(t)} \in_R \mathbb{Z}_k$ selected by a trusted third party;
setting $A_i^{(t)} \leftarrow (A_i^{(t-1)}+Z_i^{(t)})$mod k in the first server; and
setting $B_i^{(t)} \leftarrow (B_i^{(t-1)}-Z_i^{(t)})$mod k in the second server.

15. The method of claim 10 wherein the proactively updating comprises:
receiving in the second server a random value $Z_i^{(t)} \in_R \mathbb{Z}_k$ selected by the first server;
setting $A_i^{(t)} \leftarrow (A_i^{(t-1)}+Z_i^{(t)})$mod k in the first server; and
setting $B_i^{(t)} \leftarrow (B_i^{(t-1)}-Z_i^{(t)})$mod k in the second server.

16. The method of claim 7 wherein the proactively updating comprises the first and second servers collaborating with one another to randomize the index values c(i) for respective ones of the users in one or more epochs without either server individually learning the index values c(i) for respective ones of the users.

17. An article of manufacture comprising at least one non-transitory processor-readable storage medium having embodied therein one or more software programs, wherein the one or more software programs when executed by at least one processing device cause said at least one processing device:
to store in a first server a plurality of sets of passwords for respective users with each such set comprising at least one valid password for the corresponding user and a plurality of chaff passwords for that user;
to store in a second server at least a portion of valid password indication information indicating for each of the sets which of the passwords in that set is a valid password; and
to proactively update the sets of passwords and the valid password indication information in each of a plurality of epochs;
wherein the valid password indication information for a given one of the sets comprises an index value denoting an index of the valid password for the given set;
wherein the index value is stored as a shared secret across the first and second servers, such that neither the first server nor the second server stores the entire index value;
wherein the first server stores a first value and the second server stores a second value, and the index value for the given set is a function of the first and second values; and
wherein the index value is utilized to determine whether a password received from a user attempting to access a protected resource is the valid password.

18. An apparatus comprising:
at least one processing device comprising a processor coupled to a memory;
wherein said at least one processing device comprises:
a first server configured to store a plurality of sets of passwords for respective users with each such set comprising at least one valid password for the corresponding user and a plurality of chaff passwords for that user; and
a second server configured to store at least a portion of valid password indication information indicating for each of the sets which of the passwords in that set is a valid password;
wherein the first and second servers are configured to proactively update the sets of passwords and the valid password indication information in each of a plurality of epochs;
wherein the valid password indication information for a given one of the sets comprises an index value denoting an index of the valid password for the given set;
wherein the index value is stored as a shared secret across the first and second servers, such that neither the first server nor the second server stores the entire index value;
wherein the first server stores a first value and the second server stores a second value, and the index value for the given set is a function of the first and second values; and
wherein the index value is utilized to determine whether a password received from a user attempting to access a protected resource is the valid password.

19. The apparatus of claim 18 wherein the first and second servers are implemented on respective distinct ones of a plurality of processing devices.

20. The apparatus of claim 18 wherein:
the first server is configured to receive the password from the user attempting to access the protected resource, and to determine if the received password is in the set of passwords stored for the user;

if the received password is in the set of passwords stored for the user, the second server is configured to determine if the received password is the valid password or one of the chaff passwords;

if the received password is the valid password, access to the protected resource is granted; and if the received password is one of the chaff passwords, access to the protected resource is denied and an appropriate remedial action in accordance with a specified policy is taken.

* * * * *

UNITED STATES PATENT AND TRADEMARK OFFICE
CERTIFICATE OF CORRECTION

PATENT NO. : 9,154,496 B2  
APPLICATION NO. : 14/036225  
DATED : October 6, 2015  
INVENTOR(S) : Ari Juels Page 1 of 1

It is certified that error appears in the above-identified patent and that said Letters Patent is hereby corrected as shown below:

In the specification:

In the detailed description of the invention:

Column 11, line 43, please change "$X_i^{(t)}$" to -- $Y_i^{(t)}$ --

In the claims:

Claim 4, column 14, line 52, after "$W_i$" please add ","

Claim 4, column 14, line 58, please change "$W_{i,c(i)} = p_i$" to -- $w_{i,c(i)} = p_i$ --

Claim 13, column 15, line 41, please change "$Y_i^{(l)}$" to -- $Y_i^{(t)}$ --

Signed and Sealed this  
Tenth Day of May, 2016

Michelle K. Lee  
*Director of the United States Patent and Trademark Office*